United States Patent
Gershoni et al.

(10) Patent No.: US 9,036,744 B2
(45) Date of Patent: May 19, 2015

(54) ENHANCED RECEPTION OF PRECODING VECTOR SWITCHING (PVS)

(71) Applicant: Marvell World Trade Ltd., St. Michael (BB)

(72) Inventors: Shay Gershoni, Hadera (IL); Ronen Mayrench, Ra'anana (IL); Yona Perets, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/092,961

(22) Filed: Nov. 28, 2013

(65) Prior Publication Data
US 2014/0153677 A1    Jun. 5, 2014

Related U.S. Application Data

(60) Provisional application No. 61/731,969, filed on Nov. 30, 2012.

(51) Int. Cl.
*H04L 27/06* (2006.01)
*H04B 7/08* (2006.01)
*H04B 7/06* (2006.01)
*H04W 56/00* (2009.01)

(52) U.S. Cl.
CPC ............ *H04B 7/0814* (2013.01); *H04B 7/0604* (2013.01); *H04B 7/0695* (2013.01); *H04W 56/00* (2013.01)

(58) Field of Classification Search
USPC .......................................... 375/340
See application file for complete search history.

(56) References Cited

U.S. PATENT DOCUMENTS

2009/0170514 A1 * 7/2009 Yokoyama ..................... 455/436

OTHER PUBLICATIONS

3GPP TS 36.211 "Technical Specification Group Radio Access Network; Evolved Universal Terrestrial Radio Access (E-UTRA); Physical Channels and Modulation (Release 10)," version 10.3.0, section 6.11, pp. 1-103, Sep. 2012.
International Application # PCT/IB2013/060476 Search Report Dated May 5, 2014.

* cited by examiner

*Primary Examiner* — Tanmay Shah

(57) ABSTRACT

A method includes, in a mobile communication terminal, receiving a signal including multiple instances of a synchronization signal transmitted in multiple respective time periods, wherein each instance is precoded with a respective precoding scheme that is selected from a set of precoding schemes in accordance with a precoding alternation pattern. A subset of the instances of the synchronization signal is selected, in accordance with an instance selection pattern that ensures that at least one of the instances of the synchronization signal is received in the terminal with at least a predefined quality. Only the instances belonging to the selected subset are decoded.

18 Claims, 2 Drawing Sheets

ENHANCED RECEPTION OF PRECODING VECTOR SWITCHING (PVS)

CROSS-REFERENCE TO RELATED APPLICATIONS

This application claims the benefit of U.S. Provisional Patent Application 61/731,969, filed Nov. 30, 2012, whose disclosure is incorporated herein by reference.

FIELD OF THE DISCLOSURE

The present disclosure relates generally to wireless communication, and particularly to methods and systems for processing synchronization signals.

BACKGROUND

In many cellular communication systems, a base station transmits synchronization signals that are used by communication terminals for synchronizing to the base station signal. In cellular networks that operate in accordance with the Evolved Universal Terrestrial Radio Access (E-UTRA) standards, for example, each base station (referred to as eNodeB) transmits Synchronization Channels (SCH) to mobile communication terminals (referred to as User Equipment—UE). E-UTRA is also referred to as Long Term Evolution (LTE) or LTE-Advanced (LTE-A). Some E-UTRA eNodeBs precode the SCH signals with alternating precoding vectors in order to enable UEs to receive the SCH with improved signal to noise ratio. This mechanism is referred to as Precoding Vector Switching (PVS).

Processing of SCH signals in E-UTRA eNodeBs and UEs is specified, for example, by the Third Generation Partnership Project (3GPP) in "Technical Specification Group Radio Access Network; Evolved Universal Terrestrial Radio Access (E-UTRA); Physical Channels and Modulation (Release 10)," 3GPP TS 36.211, version 10.3.0, September, 2012, section 6.11, which is incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal, receiving a signal including multiple instances of a synchronization signal transmitted in multiple respective time periods, wherein each instance is precoded with a respective precoding scheme that is selected from a set of precoding schemes in accordance with a precoding alternation pattern. A subset of the instances of the synchronization signal is selected, in accordance with an instance selection pattern that ensures that at least one of the instances of the synchronization signal is received in the terminal with at least a predefined quality. Only the instances belonging to the selected subset are decoded.

In an embodiment, selecting the subset includes defining the instance selection pattern to be a-periodic. In another embodiment, selecting the subset includes setting a first period of the selection pattern to differ from a second period of the precoding alternation pattern. In yet another embodiment, selecting the subset includes synchronizing to the precoding alternation pattern and defining the instance selection pattern to include one or more of the instances in the precoding alternation pattern that are received with at least the predefined quality. In an example embodiment, synchronizing to the precoding alternation pattern includes estimating respective Signal-to-Noise Ratios (SNRs) with which the instances are received, and defining the instance selection pattern based on the SNRs.

In yet another embodiment, selecting the subset includes ascertaining that the at least one of the instances is received with at least a predefined signal-to-noise ratio. In still another embodiment, selecting the subset includes choosing the instances that fall in available measurement gaps of a communication protocol used by the terminal. In a disclosed embodiment, selecting the subset includes choosing the instances depending on available processing resources in the terminal.

There is additionally provided, in accordance with an embodiment that is described herein, apparatus including a receiver and processing circuitry. The receiver is configured to receive a signal including multiple instances of a synchronization signal transmitted in multiple respective time periods, wherein each instance of the synchronization signal is precoded with a respective precoding scheme that is selected from a set of precoding schemes in accordance with a precoding alternation pattern. The processing circuitry is configured to select a subset of the instances of the synchronization signal in accordance with an instance selection pattern that ensures that at least one of the instances of the synchronization signals is received in the receiver with at least a predefined quality, and to decode only the instances belonging to the selected subset.

The present disclosure will be more fully understood from the following detailed description of the embodiments thereof, taken together with the drawings in which:

DETAILED DESCRIPTION OF EMBODIMENTS

Figure 1:
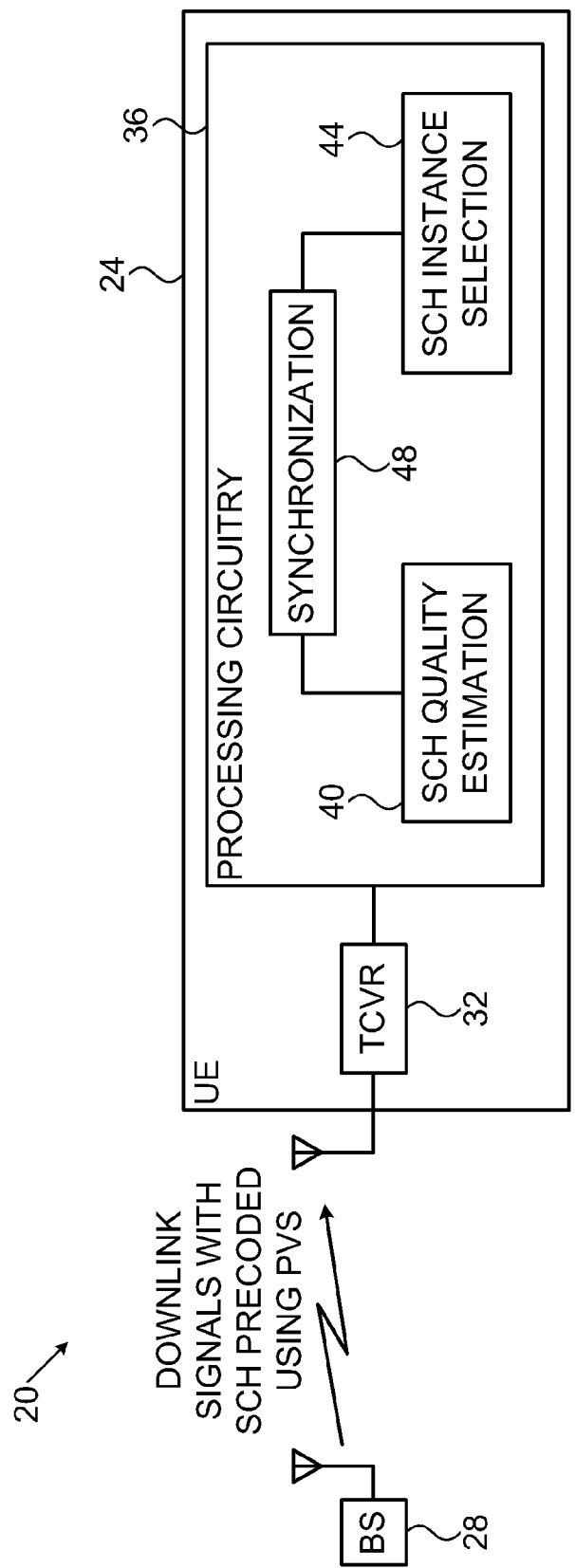
FIG. 1 is a block diagram that schematically illustrates a wireless communication system, in accordance with an embodiment that is described herein.

A typical cellular network comprises multiple base stations (BSs) that communicate with mobile communication terminals. In various standards and network types, base stations are also referred to as cells, nodeBs or eNodeBs. These terms are used interchangeably herein. In a typical cellular network, each cell transmits synchronization signals that are received and processed by mobile communication terminals. A terminal uses the synchronization signals, for example, for initial synchronization, for searching for new cells and for tracking the cell that currently serves the terminal (referred to as serving cell).

In LTE networks, for example, each cell (referred to as eNodeB) transmits synchronization signals denoted Primary Synchronization channel (P-SCH) and Secondary Synchronization Channel (S-SCH) to LTE terminals (referred to as User Equipment—UE). In the description that follows, LTE synchronization signals, including P-SCH and S-SCH, are referred to collectively as SCH. The cell transmits the SCH periodically in respective time periods. Each such transmission is referred to herein as an SCH instance.

In order to improve the reception quality of the SCH at the UEs, the cell precodes each SCH instance with a respective precoding vector, in an embodiment. Each precoding vector comprises a set of complex coefficients that are applied to the signal transmitted via the respective cell transmit antennas. The precoding operation (also referred to as beam-forming or beam-steering) causes the SCH to be transmitted from the cell with a directional, high-gain transmission beam aimed at a selected direction. The precoding vector determines the angular beam-width of the beam and the direction of transmission.

UEs that are located in the sector covered by the directional beam receive the SCH with high Signal-to-Noise Ratio (SNR). UEs outside the sector may receive the SCH with comparatively poor SNR. In order to enable adequate reception of the SCH over the entire coverage area of the cell, the cell applies different precoding vectors to different SCH instances, in accordance with a certain precoding alternation pattern. This mode of operation is referred to as Precoding Vector Switching (PVS). The precoding alternation pattern used by the cell is thus also referred to as a PVS pattern.

Thus, a given UE receives some SCH instances with high SNR, while other SCH instances may be received with poor SNR, depending on the UE location relative to the cell. The SNR with which the SCH instances are received at a given UE typically fluctuates in accordance with the precoding selection pattern used by the cell.

Embodiments that are described herein provide improved methods and systems for receiving SCH signals that are precoded using PVS. In the disclosed techniques, the UE selects and decodes only a partial subset of the SCH instances, in order to reduce power consumption. The UE selects the SCH instances to be decoded in accordance with an instance selection pattern that ensures that at least one of the SCH instances will be received with high SNR. Various techniques for setting the instance selection pattern in the UE are described herein.

In some embodiments, the UE sets the instance selection pattern in a way that intentionally does not synchronize with the PVS pattern used by the cell. In an example embodiment, if the cell PVS pattern is known or expected to have a certain period, the UE sets the instance selection pattern to have a period that does not synchronize with the PVS pattern. This setting avoids scenarios in which the UE repeatedly selects only SCH instance having poor SNR.

In another example embodiment the UE applies an a-periodic instance selection pattern, so as not to rely on any assumption regarding the periodicity of the PVS patterns. In other embodiments, the UE synchronizes to the PVS pattern used by the cell, and sets the instance selection pattern so as to choose SCH instances having high SNR. Typically, the disclosed instance selection patterns aim to avoid scenarios in which high-SNR SCH instances are missed entirely.

By selecting and decoding only a partial subset of the SCH instances, power consumption in the UE is reduced considerably. By selecting the SCH instances using the disclosed techniques, the UE is able to receive at least some of the SCH signals with high quality, in spite of the fluctuations in quality due to the PVS operation of the cell. The disclosed SCH instance selection techniques ensure that the UE resources are spent on SCH instances that are expected to be decoded with high quality.

FIG. 1 is a block diagram that schematically illustrates a cellular communication system 20, in accordance with an embodiment that is described herein. In the example of FIG. 1 system 20 comprises a mobile communication terminal 24 and a Base Station (BS) 28. In the present example system 20 operates in accordance with the LTE specifications, cited above. Alternatively, system 20 may operate in accordance with any other suitable cellular communication standard in which cells transmit synchronization signals having alternating precoding.

Depending on the applicable standard, terminal 24 is also referred to as Mobile Station (MS) or User Equipment (UE). The base station is also referred to as a cell, NodeB or eNodeB. FIG. 1 shows only a single terminal and a single cell, for the sake of clarity. Real-life scenarios, however, often involve multiple terminals and multiple cells.

In the embodiment of FIG. 1, UE 24 comprises one or more antennas for receiving downlink signals from base station 28 and for transmitting uplink signals to the base station, a transceiver (transmitter-receiver or TCVR) 32, and processing circuitry 36.

Transceiver 32 down-converts received Radio Frequency (RF) downlink signals, up-converts uplink signals to RF for transmission, and typically performs additional functions such as amplification, filtering and gain control. Processing circuitry 36 carries out the various digital processing tasks of the UE. In the present context, however, only elements relating to synchronization signal processing are shown and described, for the sake of clarity.

In some embodiments, processing circuitry 32 comprises a Synchronization Channel (SCH) quality estimation unit 40, an SCH instance selection unit 44 and a synchronization unit 48. SCH quality estimation unit 40 is configured to estimate the quality of received SCH instances. SCH instance selection unit 44 is configured to select a partial subset of the SCH instances, in accordance with a certain instance selection pattern. Synchronization unit 48 is configured to control units 40 and 44, to decode the SCH instances selected by unit 44, and to synchronize to BS 28 using the decoded SCH instances. Methods for selecting the SCH instances to be decoded are described in detail below.

The UE configuration shown in FIG. 1 is an example configuration, which is depicted solely for the sake of clarity. In alternative embodiments, any other suitable UE configuration can be used. For example, the functional partitioning among units 40, 44 and 48 in processing circuitry 36 is given purely by way of example. In alternative embodiments, the SCH processing tasks of the processing circuitry may be performed using any other suitable configuration of any desired number of units.

Some UE elements that are not mandatory for understanding of the disclosed techniques have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements may be implemented using software executing on programmable hardware, or using a combination of hardware and software elements.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory. In some embodiments, some elements of UE 24 may be fabricated in a chip-set.

Figure 2:
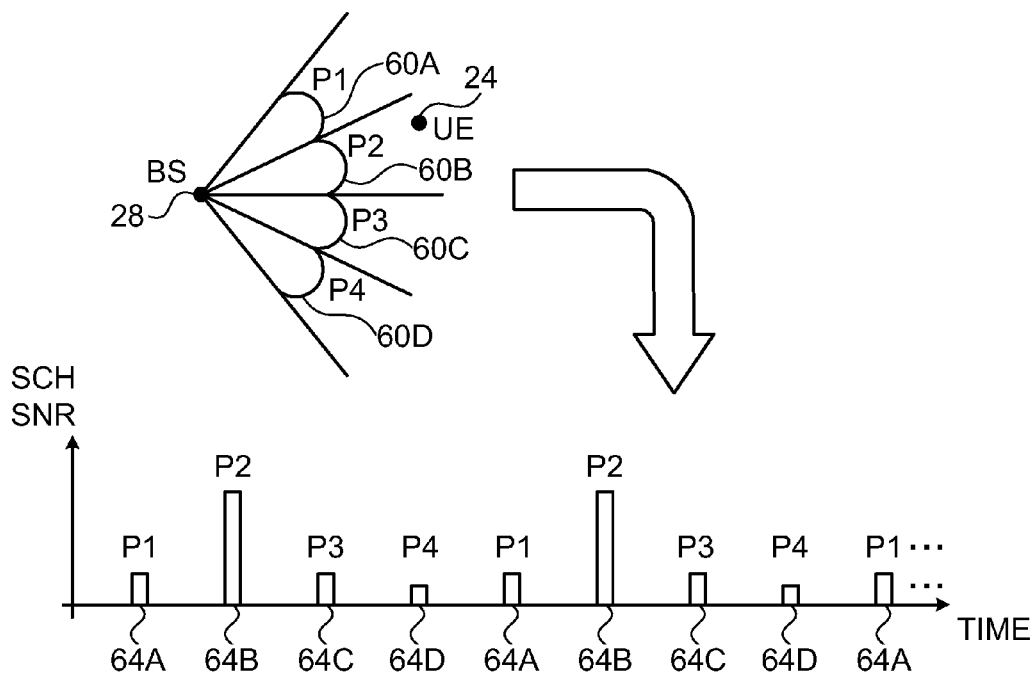
FIG. 2 is a diagram that schematically illustrates Precoding Vector Switching (PVS) operation in a wireless communication system, in accordance with an embodiment that is described herein.

FIG. 2 is a diagram that schematically illustrates Precoding Vector Switching (PVS) operation in system 20, in accordance with an embodiment that is described herein. The top of FIG. 2 shows a top view of the geographical coverage area of BS 28. In the present example, the BS coverage area comprises a 120-degree sector. UE 24 is shown at some example location in this sector.

In this embodiment, BS 28 precodes the SCH instances with an alternating sequence of four precoding vectors denoted P1 . . . P4. The four precoding vectors produce four different directional transmission beams 60A . . . 60D, respectively. In the present example the four beams are similar in beam-width, but are directed at four different directions. Each vector, in the example, covers a respective 30-degree sub-sector of the overall 120-degree sector. In other examples, the number of sectors, the angular coverage of each sector, and the total angular coverage may be different than in the illustrated example. By alternating among precoding vectors P1 . . . P4 from one SCH instance to the other, BS 28 transmits the SCH with high-gain throughout the cell coverage area, thus enabling high-quality reception by the UEs.

In the present example, BS 28 transmits an SCH instance every 5 mS. The PVS pattern (also referred to as precoding alternation pattern) comprises four instances (P1, P2, P3, P4) and is thus 20 mS long. In alternative embodiments, BS 28 may use any other suitable precoding alternation pattern.

The bottom of FIG. 2 shows the Signal-to-Noise Ratios (SNRs) with which the SCH instances are received at UE 24, as a function of time. As can be seen in the figure, UE 24 is located in the sub-sector covered by beam 60B (produced by precoding vector P2). Therefore, SCH instances 64B, which are precoded with P2, are received with high SNR. SCH instances 64A and 64C, which are precoded with P1 and P3, respectively, are received with poorer SNR because their beams (60A and 60C) are not directed toward the UE. SCH instances 64D, which are precoded with P4, are received with even poorer SNR. The 20 mS period (4×5 mS) of the PVS pattern can be seen clearly in the SNRs. Each type of SCH instance (P1, P2, P3, P4) is also referred to as a PVS index.

In some embodiments, processing circuitry 36 of UE 24 selects and decodes only a partial subset of the SCH instances seen in FIG. 2. As a result, power consumption is reduced considerably (e.g., because the receiver does not have to be activated for every SCH instance, and because fewer computations are performed). Typically, the processing circuitry selects the SCH instances for decoding in accordance with an instance selection pattern that ensures that at least some of the SCH instances will be received with high quality (e.g., with at least a predefined SNR).

When BS 28 uses the PVS pattern of FIG. 2, UE 24 selects an instance selection pattern that aims to decode at least some of SCH instances 64B, which have the highest SNR. At the same time, the instance selection pattern avoids scenarios in which high-SNR SCH instances 64B are missed altogether, and only low-SNR SCH instances (e.g., instances 64A, 64C and 64D) are received.

In one embodiment, processing circuitry 36 sets an a-periodic instance selection pattern. When the PVS pattern is periodic, an a-periodic instance selection pattern will not synchronize with the PVS pattern. Therefore, an a-periodic instance selection pattern avoids scenarios in which only instances 64A, 64C and 64D. Thus, some of the high-SNR instances 64B are bound to be received. In an example embodiment, when the period of the PVS pattern is four SCH instances (20 mS), processing circuitry 36 may select the SCH instances at dithered intervals of 45 mS, then 30 mS, then 45 mS, and then again 45 mS. Various other suitable a-periodic patterns can also be used.

In another embodiment, processing circuitry 36 sets a periodic instance selection pattern, whose period is different from the period of the PVS pattern of the BS. In an example embodiment, when the period of the PVS pattern is four SCH instances (20 mS), processing circuitry 36 may set an instance selection pattern having a period of three SCH instances (15 mS). Alternatively, processing circuitry 36 may use any other suitable period that differs from (and is not an integer multiple of) the PVS pattern period.

In yet another embodiment, processing circuitry 36 synchronizes to the PVS pattern of BS 28, and chooses the instance selection pattern so as to decode the high-SNR SCH instances. By synchronizing to the PVS pattern, processing circuitry 36 predicts which SCH instances are expected to have high SNR and/or which SCH instances are expected to have poor SNR, and then decodes only high-SNR SCH instances. Referring to FIG. 2, for example, processing circuitry 36 synchronizes to the four-instance periodicity of the PVS pattern, and then decodes only instances 64B.

In some embodiments, processing circuitry 36 does not include all the high-SNR SCH instances in the instance selection pattern. In an embodiment, the processing circuitry chooses only the high-SNR instances that fall within available measurement gaps in the protocol, or only the high-SNR instances that the UE can process with its available processing resources. In an embodiment, processing circuitry 36 ranks the various SCH instances based on their respective SNRs, and decides which SCH instances to include in the instance selection pattern based on the ranks.

The instance selection patterns and selection criteria described above are depicted purely by way of example. In alternative embodiments, processing circuitry 36 may use any other suitable pattern or criterion.

Figure 3:
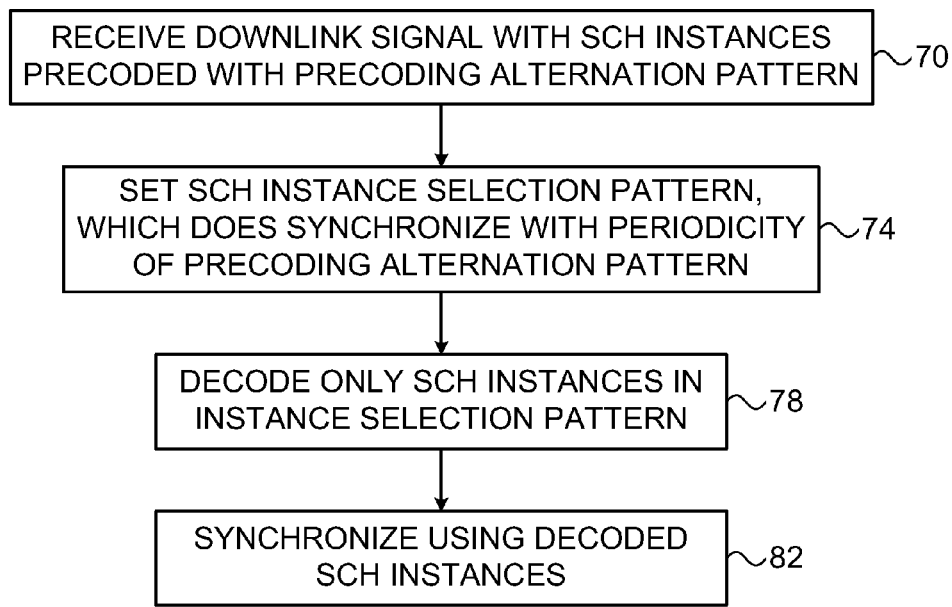
FIG. 3 is a flow chart that schematically illustrates a method for synchronization, in accordance with an embodiment that is described herein.

FIG. 3 is a flow chart that schematically illustrates a method for synchronization of UE 24 to the signals of BS 28, in accordance with an embodiment that is described herein. The method begins with transceiver 32 of UE 24 receiving downlink signals from BS 28, at a reception operation 70. The downlink signals comprise a sequence of SCH instances that are precoded in accordance with a PVS pattern, as explained above.

At an instance selection operation 74, processing circuitry 36 of UE 24 sets an instance selection pattern that ensures that at least one of the SCH instances will be received with at least a predefined quality. Processing circuitry 36 decodes only the SCH instances in the instance selection pattern, at a selective decoding operation 78. As a result, the UE power consumption is reduced considerably, while focusing on high-quality (e.g., high-SNR) SCH instances. Processing circuitry 36 synchronizes to BS 28 using the selectively-decoded SCH instances.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal, receiving a signal comprising multiple instances of a synchronization signal transmitted in multiple respective time periods, wherein each instance is precoded with a respective precoding scheme that is selected from a set of precoding schemes in accordance with a precoding alternation pattern;

defining in the terminal an instance selection pattern, which selects for decoding only a subset of the instances of the synchronization signal and excludes from decoding one or more of the instances of the synchronization signal that are present in the precoding alternation pattern, and which ensures that at least one of the instances of the synchronization signal is received in the terminal with at least a predefined quality; and reducing power consumption of the terminal by attempting to decode only the instances belonging to the instance selection pattern.

2. The method according to claim 1, wherein defining the instance selection pattern comprises defining the instance selection pattern to be a-periodic.

3. The method according to claim 1, wherein defining the instance selection pattern comprises setting a first period of the instance selection pattern to differ from a second period of the precoding alternation pattern.

4. The method according to claim 1, wherein defining the instance selection pattern comprises synchronizing to the precoding alternation pattern and defining the instance selection pattern to include one or more of the instances in the precoding alternation pattern that are received with at least the predefined quality.

5. The method according to claim 4, wherein synchronizing to the precoding alternation pattern comprises estimating respective Signal-to-Noise Ratios (SNRs) with which the instances are received, and defining the instance selection pattern based on the SNRs.

6. The method according to claim 1, wherein defining the instance selection pattern comprises ascertaining that the at least one of the instances is received with at least a predefined signal-to-noise ratio.

7. The method according to claim 1, wherein defining the instance selection pattern comprises choosing the instances that fall in available measurement gaps of a communication protocol used by the terminal.

8. The method according to claim 1, wherein defining the instance selection pattern comprises choosing the instances depending on available processing resources in the terminal.

9. Apparatus, comprising:

a receiver, which is configured to receive a signal comprising multiple instances of a synchronization signal transmitted in multiple respective time periods, wherein each instance of the synchronization signal is precoded with a respective precoding scheme that is selected from a set of precoding schemes in accordance with a precoding alternation pattern; and processing circuitry, which is configured to define an instance selection pattern, which selects for decoding only a subset of the instances of the synchronization signal and excludes from decoding one or more of the instances of the synchronization signal that are present in the precoding alternation pattern, and which ensures that at least one of the instances of the synchronization signals is received in the receiver with at least a predefined quality, and to reduce power consumption of the apparatus by attempting to decode only the instances belonging to the instance selection pattern.

10. The apparatus according to claim 9, wherein the processing circuitry is configured to define the instance selection pattern to be a-periodic.

11. The apparatus according to claim 9, wherein the processing circuitry is configured to set a first period of the instance selection pattern to differ from a second period of the precoding alternation pattern.

12. The apparatus according to claim 9, wherein the processing circuitry is configured to synchronize to the precoding alternation pattern and to define the instance selection pattern so as to include one or more of the instances in the precoding alternation pattern that are received with at least the predefined quality.

13. The apparatus according to claim 12, wherein the processing circuitry is configured to synchronize to the precoding alternation pattern by estimating respective Signal-to-Noise Ratios (SNRs) with which the instances are received, and defining the instance selection pattern based on the SNRs.

14. The apparatus according to claim 9, wherein the processing circuitry is configured to define the instance selection pattern by ascertaining that the at least one of the instances is received with at least a predefined signal-to-noise ratio.

15. The apparatus according to claim 9, wherein the processing circuitry is configured to define the instance selection pattern by choosing the instances that fall in available measurement gaps of a communication protocol used by the apparatus.

16. The apparatus according to claim 9, wherein the processing circuitry is configured to define the instance selection pattern by choosing the instances depending on available processing resources.

17. A mobile communication terminal comprising the apparatus of claim 9.

18. A chipset for processing signals in a mobile communication terminal, comprising the apparatus of claim 9.

* * * * *